US010281101B2

(12) United States Patent
Lin et al.

(10) Patent No.: US 10,281,101 B2
(45) Date of Patent: May 7, 2019

(54) VEHICLE LAMP WITH SEGMENTED ELLIPSOIDAL REFLECTOR, CONDENSER LENS, AND PLURALITY OF LIGHT SOURCES MOUNTED ON DIFFERENT PLANES OF HEAT DISSIPATING BASE

(71) Applicant: Lextar Electronics Corporation, Hsinchu (TW)

(72) Inventors: Shih-Kai Lin, Tainan (TW); Yu-Min Lin, New Taipei (TW)

(73) Assignee: LEXTAR ELECTRONICS CORPORATION, Hsinchu (TW)

(*) Notice: Subject to any disclaimer, the term of this patent is extended or adjusted under 35 U.S.C. 154(b) by 707 days.

(21) Appl. No.: 14/979,557

(22) Filed: Dec. 28, 2015

(65) Prior Publication Data

US 2016/0305628 A1 Oct. 20, 2016

(30) Foreign Application Priority Data

Apr. 16, 2015 (TW) ............................ 104112267 A

(51) Int. Cl.
*B60Q 1/04* (2006.01)
*F21S 41/143* (2018.01)
(Continued)

(52) U.S. Cl.
CPC ........... *F21S 41/143* (2018.01); *F21S 41/147* (2018.01); *F21S 41/155* (2018.01); *F21S 41/255* (2018.01);
(Continued)

(58) Field of Classification Search
CPC ... F21Y 2101/02; F21S 48/02; F21S 48/1233; F21S 48/145; F21S 48/1757;
(Continued)

(56) References Cited

U.S. PATENT DOCUMENTS 5,738,436 A * 4/1998 Cummings ............. F21S 8/026
362/148
7,431,486 B2 * 10/2008 Bloemen ............. B60Q 1/0052
362/540
(Continued)

FOREIGN PATENT DOCUMENTS

CN 202371614 U 8/2012
CN 203823629 U 9/2014
(Continued)

*Primary Examiner* — Ismael Negron
(74) *Attorney, Agent, or Firm* — CKC & Partners Co., LLC

(57) ABSTRACT

A vehicle lamp includes a condenser lens with a focal plane and an optical axis, a heat-dissipation base disposed at a side of the condenser lens such that the focal plane is disposed between the condenser lens and the heat-dissipation base, a first light source disposed on the heat-dissipation base with a first light-emitting surface facing the focal plane, a reflector disposed on the heat-dissipation base and having a plurality of ellipsoidal surfaces with at least one of the two focal points of each of the ellipsoidal surfaces located on the focal plane, and a second light source disposed on the heat-dissipation base with a substrate and second light-emitting surfaces disposed on the substrate facing the reflector.

9 Claims, 5 Drawing Sheets

(51) Int. Cl.

| | |
|---|---|
| ***F21S 41/147*** | (2018.01) |
| ***F21S 41/155*** | (2018.01) |
| ***F21S 41/20*** | (2018.01) |
| ***F21S 41/255*** | (2018.01) |
| ***F21S 41/32*** | (2018.01) |
| ***F21S 41/33*** | (2018.01) |
| ***F21S 41/36*** | (2018.01) |
| ***F21S 41/663*** | (2018.01) |
| ***F21S 45/47*** | (2018.01) |

(52) U.S. Cl.
CPC ........... *F21S 41/285* (2018.01); *F21S 41/321* (2018.01); *F21S 41/336* (2018.01); *F21S 41/36* (2018.01); *F21S 41/663* (2018.01); *F21S 45/47* (2018.01)

(58) Field of Classification Search
CPC .. F21S 48/1388; F21S 48/1159; F21S 41/141; F21S 41/143; F21S 41/147; F21S 41/148; F21S 41/151; F21S 41/33; F21S 41/336; F21S 41/663
USPC ................................ 362/507, 509, 514, 517
See application file for complete search history.

(56) References Cited

U.S. PATENT DOCUMENTS

| | | | | |
|---|---|---|---|---|
| 7,589,336 | B2 * | 9/2009 | Kaszuba | B05D 3/067 250/492.1 |
| 7,654,714 | B2 * | 2/2010 | Mochizuki | B60Q 1/0041 362/539 |
| 7,722,236 | B2 * | 5/2010 | Naganawa | B60Q 1/085 362/543 |
| 7,985,013 | B2 * | 7/2011 | Yasuda | F21S 41/147 362/547 |
| 8,162,507 | B2 * | 4/2012 | Inaba | F21S 41/147 362/243 |
| 8,425,097 | B2 * | 4/2013 | Yamamoto | F21S 41/147 362/539 |
| 8,545,073 | B2 | 10/2013 | Meyrenaud et al. | |
| 8,678,629 | B2 | 3/2014 | Ishida et al. | |
| 8,690,405 | B2 * | 4/2014 | Sekiguchi | F21V 13/12 362/514 |
| 8,899,806 | B2 * | 12/2014 | Anzai | B60Q 1/0011 362/545 |
| 8,950,917 | B2 * | 2/2015 | Yasuda | F21S 48/1109 362/516 |
| 2008/0062709 | A1 | 3/2008 | Mochizuki et al. | |
| 2017/0343173 | A1 * | 11/2017 | Takada | F21S 41/00 |

FOREIGN PATENT DOCUMENTS

| | | | |
|---|---|---|---|
| DE | 102012106483 | A1 | 1/2014 |
| EP | 1471304 | A2 | 10/2004 |
| EP | 2159479 | A2 | 3/2010 |
| EP | 2194312 | A2 | 6/2010 |
| FR | 2944578 | A1 | 10/2010 |
| JP | 2005317226 | A | 11/2005 |
| JP | 2007324002 | A | 12/2007 |
| JP | 2008-71555 | A | 3/2008 |
| JP | 2011-90905 | A | 5/2011 |
| JP | 2012-524958 | A | 10/2012 |
| JP | 2013-62147 | A | 4/2013 |
| JP | 2013-134887 | A | 7/2013 |
| JP | 2013-242996 | A | 12/2013 |
| JP | 2013-243130 | A | 12/2013 |
| JP | 2014-203640 | A | 10/2014 |
| JP | 2014-212089 | A | 11/2014 |
| KR | 20100006367 | A | 1/2010 |
| WO | 2013037799 | A1 | 3/2013 |

* cited by examiner

VEHICLE LAMP WITH SEGMENTED ELLIPSOIDAL REFLECTOR, CONDENSER LENS, AND PLURALITY OF LIGHT SOURCES MOUNTED ON DIFFERENT PLANES OF HEAT DISSIPATING BASE

RELATED APPLICATIONS

This application claims priority to Taiwanese Application Serial Number 104112267, filed Apr. 16, 2015, which is herein incorporated by reference.

BACKGROUND

Technical Field

The present disclosure relates to a lamp. More particularly, the present disclosure relates to a vehicle lamp.

Description of Related Art

Vehicular luminaries have always been one of the key development projects in the field of lighting. In recent years, LEDs (light-emitting diodes) have gradually replaced the conventional light sources applied in vehicular luminaries because LEDs have advantages such as high luminous efficacy, high brightness, low power consumption and instant response.

However, due to the shape and size of LEDs emitting surface, there will be issues on focusing design if the optical system in vehicular luminaries is projection type or PES type.

SUMMARY

An aspect of the present disclosure provides a vehicle lamp including a sectional-type reflector and a second light source used as a high-beam light source. The sectional-type reflector is designed to have several second focal points located on a focal plane of a condenser lens. With the sectional-type reflector, light beams emitted by second light-emitting surfaces of the second light source can be focused onto a point at the second focal points of the reflector, such that dark fringes in the light pattern of a high beam caused by gaps between LED chips can be removed.

An aspect of the present disclosure provides a vehicle lamp including a condenser lens, a heat-dissipation base, a first light source, a second light source, and a reflector. The condenser lens has a focal plane and an optical axis. The heat-dissipation base is disposed at a side of the condenser lens, in which the focal plane is disposed between the condenser lens and the heat-dissipation base. The first light source is disposed on the heat-dissipation base, in which the first light source includes a first light-emitting surface facing toward the focal plane. The second light source is disposed on the heat-dissipation base, in which the second light source includes a substrate and second light-emitting surfaces. The second light-emitting surfaces are disposed adjacent to each other on the substrate in a side-by-side arrangement. The second light-emitting surfaces are defined as M light-emitting groups, and each of the light-emitting groups has N light-emitting zones, and M and N are greater than 1. The reflector is disposed on the heat-dissipation base, in which the second light source faces toward the reflector. The reflector includes M reflective surfaces corresponding to the M light-emitting groups, and each of the reflective surfaces is a partial curved surface of an ellipsoid. The reflective surfaces respectively have first focal points and second focal points, and the second focal points are located on the focal plane of the condenser lens.

In some embodiments, one of edges of the first light source coincides with the optical axis.

In some embodiments, the heat-dissipation base includes a first plane and a second plane. The second plane is titled to the first plane. The first light source is disposed on the first plane, and the second light source is disposed on the second plane.

In some embodiments, the M first focal points are respectively located within the M corresponding light-emitting groups.

In some embodiments, the first light-emitting surface and the second light-emitting surfaces at least include a light-emitting diode (LED) or an organic LED (OLED).

In some embodiments, the reflector has a symmetry axis. The reflective surfaces are symmetric about the symmetry axis, and the light-emitting groups disposed on the substrate are symmetric about the symmetry axis.

In some embodiments, the ellipsoid corresponding to each of the reflective surfaces has a major axis. The major axis is a straight line connecting the first focal point and the second focal point in each of the ellipsoids, and the major axes of the ellipsoids intersect to each other at a point of the focal plane.

In some embodiments, an extending direction of each of the major axes of the ellipsoids is tilted to a plane on which the second light source is disposed with an angle, and the angle is in a range from 0 degree to 45 degrees.

In some embodiments, the vehicle lamp further includes a connecting element connecting the heat-dissipation base and the reflector, in which the connecting element is configured to shift the second focal points of the reflective surfaces.

DETAILED DESCRIPTION

Figure 1A:
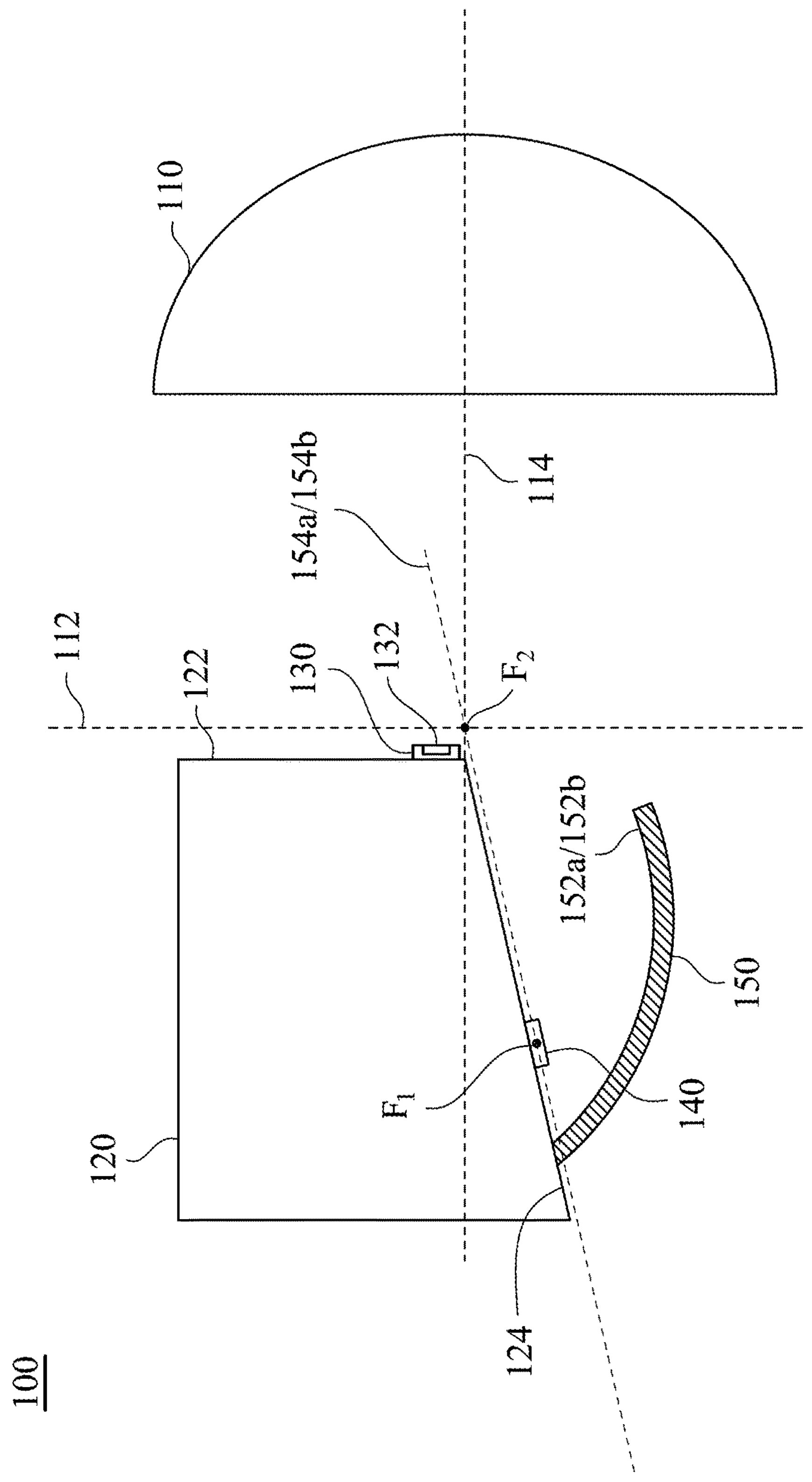
FIG. 1A is a cross-sectional diagram of a vehicle lamp according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It will be understood that, although the terms first, second, third etc. may be used herein to describe various elements, components, regions, layers and/or sections, these elements, components, regions, layers and/or sections should not be limited by these terms.

According to a problem that light beam provided by a vehicle lamp may have dark fringes due to gaps between light-emitting diode (LED) chips, a light beam projected by the vehicle lamp may be non-uniform. Hence, an aspect of the present disclosure provides a vehicle lamp including a sectional-type reflector. Through the sectional-type reflector, the dark fringes in the light pattern of a high beam caused by the gaps between LED chips can be removed, such that the high beam projected by the vehicle lamp can meet the regulations of vehicle lighting. Furthermore, in the vehicle lamp of the present disclosure, the high beam projected by the vehicle lamp is produced by an arrangement of the single reflector corresponding to light-emitting surfaces of a light source.

Figure 1B:
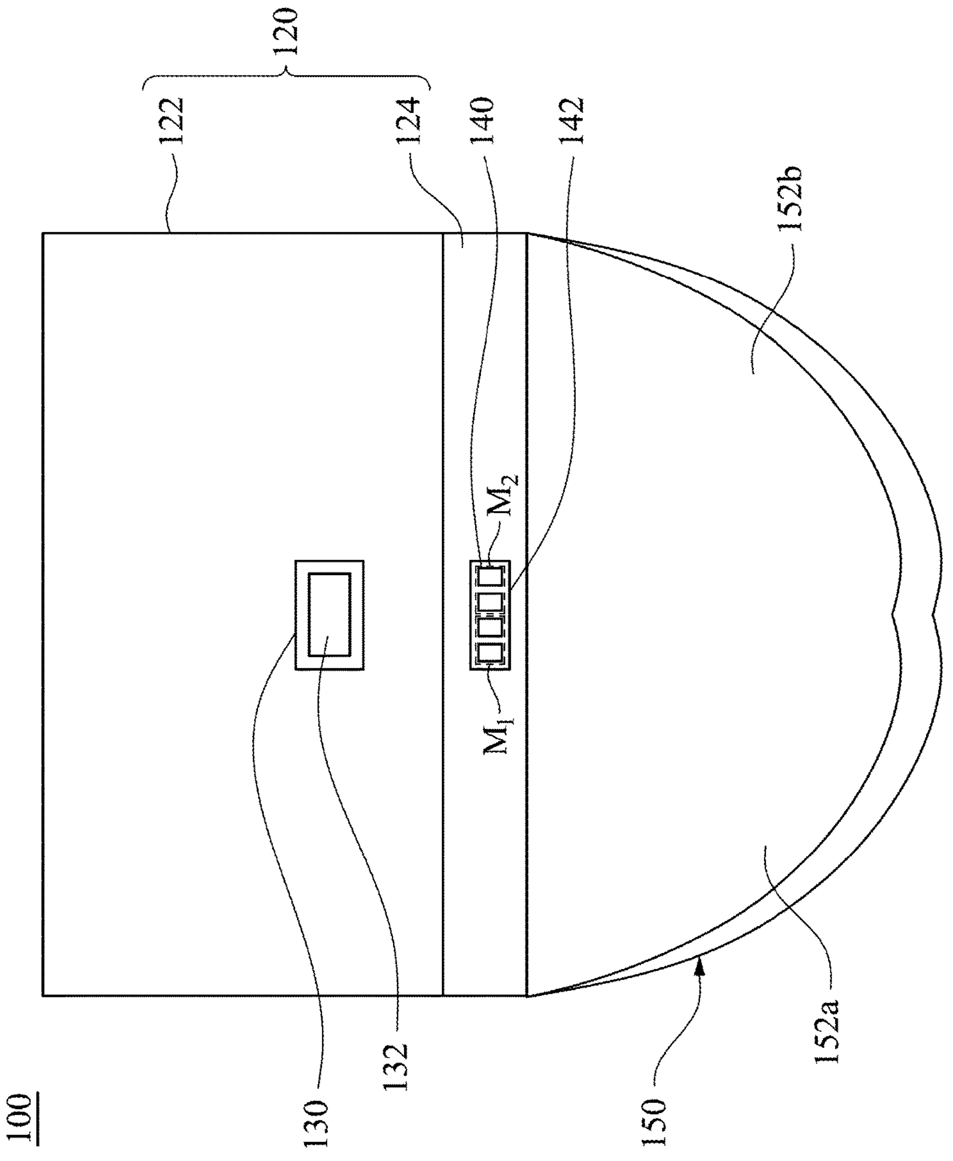
FIG. 1B is a schematic diagram of a heat-dissipation base viewed from a condenser lens in FIG. 1A.

FIG. 1A is a cross-sectional diagram of a vehicle lamp 100 according to a first embodiment of the present disclosure. FIG. 1B is a schematic diagram of a heat-dissipation base 120 viewed from a condenser lens 110 in FIG. 1A. A vehicle lamp 100 includes a condenser lens 110, a heat-dissipation base 120, a first light source 130, a second light source 140, and a reflector 150. The condenser lens 110 has a focal plane 112 and an optical axis 114. The heat-dissipation base 120 is disposed at a side of the condenser lens 110, in which the focal plane 112 is disposed between the condenser lens 110 and the heat-dissipation base 120. The heat-dissipation base 120 includes a first plane 122 and a second plane 124 which are adjacent to each other. In other embodiments, the heat-dissipation base 120 includes the first plane 122 and the second plane 124 which are adjacent to each other, in which the optical axis 114 can pass through an interface between the first plane 122 and the second plane 124. Furthermore, the second plane 124 is tilted to the first plane 122.

The first light source 130 is disposed on the first plane 122 of the heat-dissipation base 120. The first light source 130 includes a first light-emitting surface 132 facing toward the focal plane 112. The first light source 130 includes a light-emitting diode (LED) or an organic LED (OLED). The second light source 140 is disposed on the second plane 124 of the heat-dissipation base 120. The reflector 150 is disposed on the second plane 124 of the heat-dissipation base 120, in which the second light source 140 faces toward the reflector 150. Thus, the reflector 150 can receive a light beam provided by the second light source 140.

As shown in FIG. 1A, the first light source 130 and the second light source 140 are respectively disposed at two opposite sides of the optical axis 114, and the first light source 130 and the second light source 140 can be configured as light sources of the vehicle lamp 100. For example, the first light source 130 can be a low-beam light source and the second light source 140 can be a high-beam light source.

For the first light source 130 used as the low-beam light source, the first light source 130 is disposed near the focal plane 112 of the condenser lens 110. The first light-emitting surface 132 of the first light source 130 is located at an upper side of the optical axis 114 of the condenser lens 110, and an edge of the first light source 130 is located near the optical axis 114 of the condenser lens 110. Therefore, the light pattern of the low beam projected by the vehicle lamp 100 can have a cutoff line to meet the regulations of vehicle lighting.

Figure 1C:
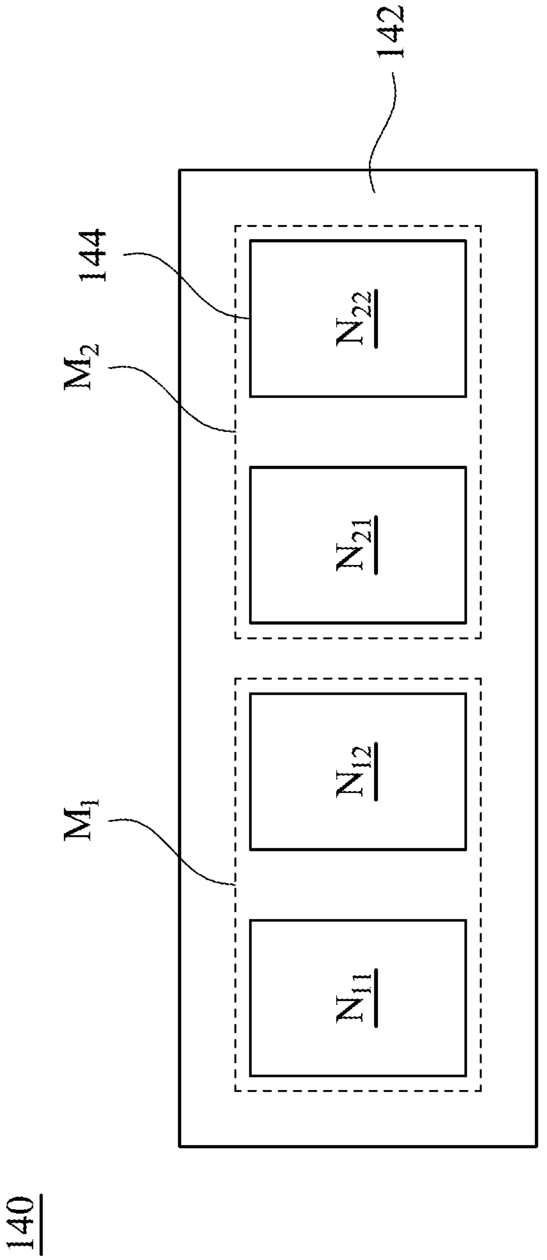
FIG. 1C is a configuration of a second light source in FIG. 1B.

FIG. 1C is a configuration of the second light source 140 in FIG. 1B. In FIG. 1C, the second light source 140 is viewed along a direction normal to the second light source 140. As shown in FIGS. 1B and 1C, the second light source 140 includes a substrate 142 and four second light-emitting surfaces 144. The second light-emitting surfaces 144 are disposed adjacent to each other on the substrate 142 in a side-by-side arrangement. The second light-emitting surfaces 144 are defined as two light-emitting groups $M_1$ and $M_2$. The light-emitting group $M_1$ has two light-emitting zones $N_{11}$ and $N_{12}$, and the light-emitting group $M_2$ has two light-emitting zones $N_{21}$ and $N_{22}$. In other words, in the second light source 140, the second light-emitting surfaces 144 in the light-emitting groups $M_1$ and $M_2$ are taken as the light-emitting zones $N_{11}$-$N_{12}$ and $N_{21}$-$N_{22}$. Furthermore, the second light source 140 includes an LED or an OLED. For example, the second light-emitting surfaces 144 can be LED chips disposed on the substrate 142.

In some embodiments, the second light-emitting surfaces 144 of the second light source 140 are defined as M light-emitting groups, in which each of the M light-emitting groups includes N light-emitting zones, and M and N are greater than 1. For example, in the present embodiment, both M and N are two. Furthermore, the number of the second light-emitting surfaces 144 of the second light source 140 is the product of M and N.

Figure 1D:
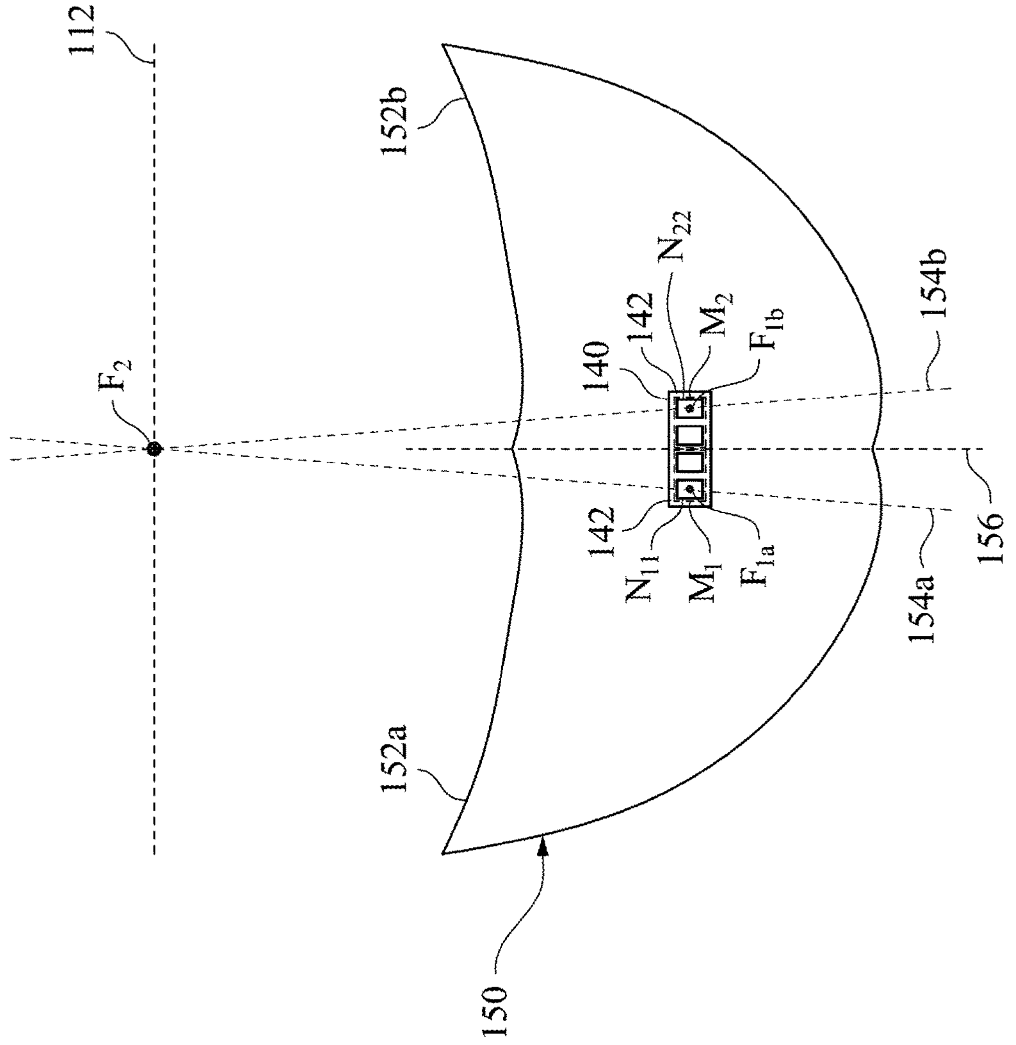
FIG. 1D is a configuration of the second light source and a reflector on the heat-dissipation base in FIG. 1B.

FIG. 1D is a configuration of the second light source 140 and the reflector 150 on the heat-dissipation base 120 in FIG. 1B. In FIG. 1D, the configuration of the second light source 140 and the reflector 150 is viewed along a direction normal to the second plane 124 of FIG. 1B.

As shown in FIGS. 1A, 1B, and 1D, the reflector 150 includes two reflective surfaces **152*a* and 152*b* corresponding to the two light-emitting groups $M_1$ and $M_2$. Thus, the number of the reflective surfaces 152*a* and 152*b* of the reflector 150 and the number of the light-emitting groups $M_1$ and $M_2$ are the same. Each of the reflective surfaces 152*a* and 152*b* is a partial curved surface of an ellipsoid. The reflective surfaces 152*a* and 152*b* respectively have first focal points $F_1$ and second focal points $F_2$. The second focal points $F_2$ are located at the same position, in which the second focal points $F_2$ are located at an intersection of the focal plane 112 and the optical axis 114, as shown in FIG. 1**A.

Furthermore, as shown in FIG. 1D, in the present embodiment, since the number of the reflective surfaces **152*a* and 152*b* of the reflector 150 is two, the number of the first focal points $F_{1a}$ and $F_{1b}$ of the reflector 150 is two. The two first focal points $F_{1a}$ and $F_{1b}$ are respectively located within the two corresponding light-emitting groups $M_1$ and $M_2$, and the two first focal points $F_{1a}$ and $F_{1b}$ can be respectively located within one of the light-emitting zones $N_{11}$-$N_{12}$ and one of the light-emitting zones $N_{21}$-$N_{22}$. For example, the first focal point $F_{1a}$ of the reflective surface 152*a* is located within the light-emitting zone $N_{11}$ of the light-emitting group $M_1$, and the first focal point $F_{1b}$ of the reflective surface 152*b* is located within the light-emitting zone $N_{22}$ of the light-emitting group $M_2$. The ellipsoid corresponding to each of the reflective surfaces 152*a* and 152*b* has a major axis 154*a*/154*b*. For example, the major axis 154*a* is corresponding to the reflective surface 152*a*, and the major axis 154*b* is corresponding to the reflective surface 152*b*. The major axes 154*a* and 154*b* are straight lines connecting the first focal points $F_{1a}$ and $F_{1b}$ and the second focal points $F_2$ respectively, and the major axes 154*a* and 154*b* of the two ellipsoids are intersected to each other at the focal plane 112**.

The reflector 150 has a symmetry axis 156. The reflective surfaces **152*a* and 152*b* are symmetric about the symmetry axis 156, and thus a vertical projection of the symmetry axis 156 on the reflector 150 can be used as a boundary between the reflective surfaces 152*a* and 152*b*. In addition, the light-emitting groups $M_1$ and $M_2$ disposed on the substrate 142 are symmetric about the symmetry axis 156. Furthermore, the light-emitting zones $N_{11}$-$N_{12}$ of the light-emitting group $M_1$ and the light-emitting zones $N_{21}$-$N_{22}$ of the light-emitting group $M_2$ are also symmetric about this symmetry axis 156**.

As previously described, the second light source 140 can be the high-beam light source. For the second light source 140 used as the high-beam light source, light beams provided by the second light-emitting surfaces 144 of the second light source 140 are reflected by the reflective surfaces 152*a* and 152*b* of the reflector 150 to be focused onto the second focal points $F_2$ of the reflector 150. Then, since the second focal points $F_2$ are located at the intersection of the focal plane 112 and the optical axis 114 of the condenser lens 110, after the light beams provided by the second light-emitting surfaces 144 are converged by the condenser lens 110, the vehicle lamp 100 can project the high beam meeting the regulations of vehicle lighting.

In the present embodiment, the number of the second light source 140 used as the high-beam light source is one, and the reflector 150 is a sectional type reflector provided by combining the two reflective surfaces 152*a* and 152*b* with ellipsoid structure. Under the sectional configuration, since the light beams provided by the light-emitting groups $M_1$ and $M_2$ are respectively reflected and focused by the reflective surfaces 152*a* and 152*b*, each of the reflective surfaces 152*a* and 152*b* may correspond to the smaller numbers of the gaps between the LED chip, thereby improving the problem of the dark fringes caused by the gaps between the LED chips in the high beam. Moreover, since scales of distances between the reflective surfaces 152*a* and 152*b* and between the first focal points $F_{1a}$ and $F_{1b}$ belong to the chip scale, the dark fringes may not produced in the light beams reflected from the two reflective surfaces 152*a* and 152*b*.

Furthermore, since the first focal points $F_{1a}$ and $F_{1b}$ of the reflective surfaces 152*a* and 152*b* are respectively located within the light-emitting groups $M_1$ and $M_2$, the light beams provided by the second light source 140 can be effectively focused onto the second focal points $F_2$ by the reflector 150, thereby resulting in better optical performance of the vehicle lamp 100. Moreover, since the light-emitting groups $M_1$ and $M_2$ on the second light source 140 are symmetric about the symmetry axis 156, after the high beam provided by the second light source 140 is projected by the reflector 150, the light pattern of the high beam is symmetrical.

As described above, in the vehicle lamp 100 of the present disclosure, the light beams emitted by the second light-emitting surfaces 144 of the single second light source 140 are focused onto the second focal points F2 located at the same position by the single reflector 150 which is the sectional type, and then the light beams are projected by the condenser lens 110 to become the high beam. However, a person having ordinary skill in the art may choose the proper number of the second light-emitting surfaces 144.

In other words, in the present embodiment, although both the numbers of the light-emitting groups and the light-emitting zones are two, a person having ordinary skill in the art may adjust the numbers of the light-emitting groups and the light-emitting zones according to the above descriptions. For example, the number of the light-emitting groups and the numbers of the light-emitting zones of each of the light-emitting groups can be respectively adjusted to be three and four. Under this configuration, the second light source 140 includes twelve second light-emitting surfaces 144 (by the product of the light-emitting groups and the light-emitting zones), and thus the second light-emitting surfaces 144 are defined as the four light-emitting groups and each of the light-emitting groups has the three light-emitting zones.

Figure 2:
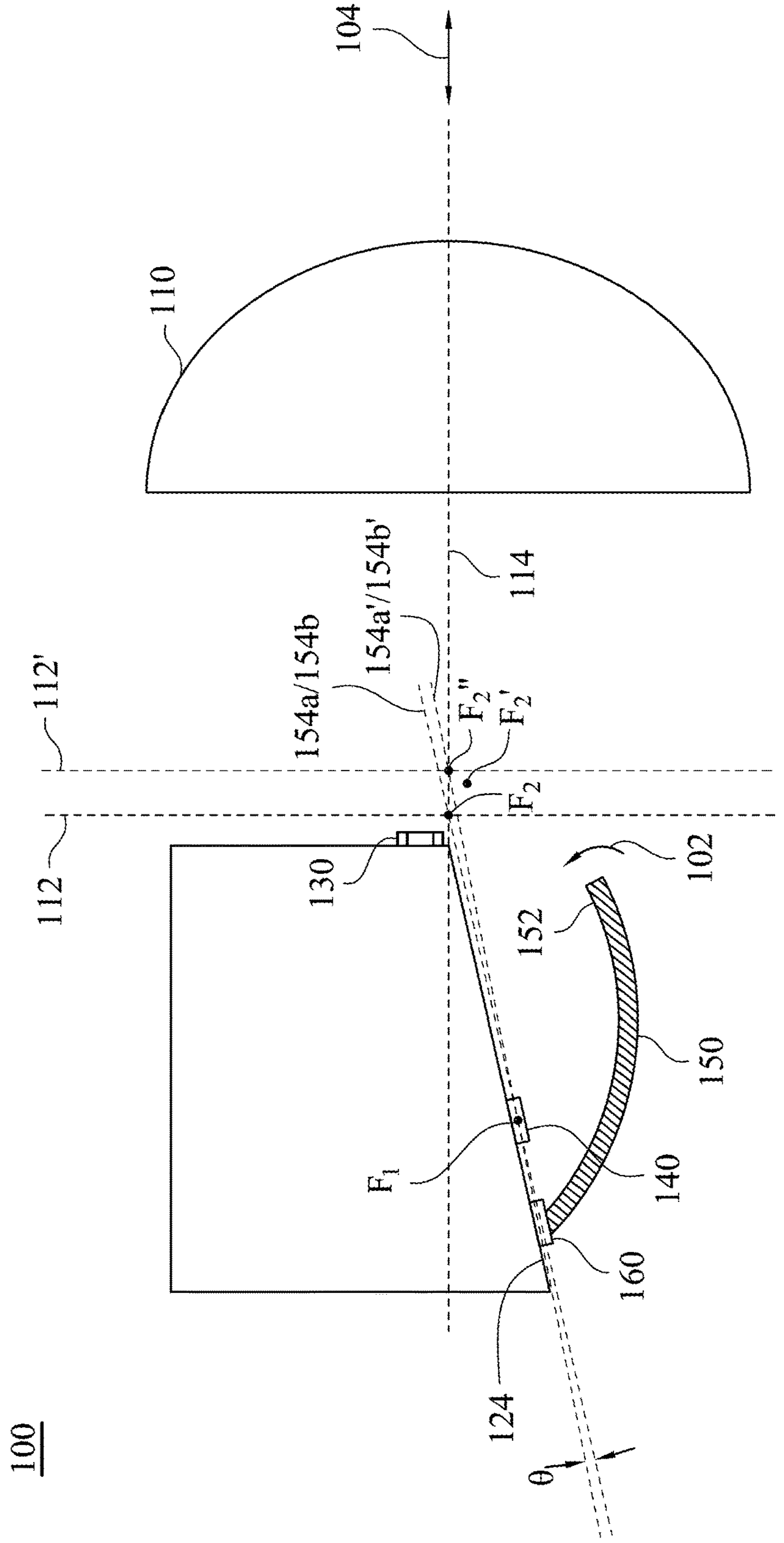
FIG. 2 is a cross-sectional diagram of a vehicle lamp according to a second embodiment of the present disclosure.

FIG. 2 is a cross-sectional diagram of a vehicle lamp 100 according to a second embodiment of the present disclosure. The difference between the present embodiment and the first embodiment is that the vehicle lamp 100 of the present embodiment further includes a connecting element 160, and an extending direction of each of the major axes 154*a*' and 154*b*' of the ellipsoids of the reflector 150 is tilted to a plane on which the second light source 140 is disposed.

The connecting element 160 connects the heat-dissipation base 120 and the reflector 150, in which the connecting element 160 is configured to shift the second focal points $F_2$ of the reflective surfaces 152. Thus, with the connecting element 160, the reflector 150 is shifted relatively to the heat-dissipation base 120, such that the second focal points $F_2$ can be shifted with the shifting of the reflector 150. The second focal points $F_2$ are shifted from a position marked as the second focal points $F_2$ to a position marked as the second focal points $F_2$'. In addition, the first focal points $F_1$ are disposed to be kept within the second light source 140 by adjusting the size of the reflector 150 or adjusting the arrangement of the reflector 150 and the connecting element 160 in this step. Under this configuration, since the reflector 150 is shifted relatively to the heat-dissipation base 120, the possibility that the first light source 130 or the heat-dissipation base 120 on which the first light source 130 is disposed may block the light beams reflected from the reflector 150 is reduced. Therefore, the first light source 130 can be disposed closer to the optical axis 114. For example, as shown in FIG. 2, one of the edges of the first light source 130 can coincide with the optical axis 114. As the first light source 130 is disposed closer to the optical axis 114, the cutoff line in the light pattern of the low beam can become clearer.

Then, the second focal points $F_2$ of the reflector 150 can be adjusted by adjusting the size of the reflector 150 or by adjusting the arrangement of the reflector 150 and the connecting element 160. For example, the reflector 150 can be counterclockwise tilted along an arrow 102. Furthermore, the first focal points $F_1$ are still disposed to be kept within the second light source 140. After the reflector 150 is counterclockwise tilted, the extending direction of each of the major axes 154*a*' and 154*b*' of the ellipsoids of the reflector 150 is tilted to a plane on which the second light source 140 is disposed (thus, each of the major axes 154*a*' and 154*b*' of the ellipsoids of the reflector 150 is tilted to the second plane 124) with an angle θ, and the angle θ is in a range from 0 degree to 45 degrees. For clearly expressing the angle θ, the major axes 154*a* and 154*b* of FIG. 1 are also illustrated in FIG. 2, in which the major axes 154*a* and 154*b* of FIG. 1 are parallel to the second plane 124. Therefore, the angle θ of FIG. 2 is marked between the major axes 154*a* and 154*b* and the major axes 154*a*' and 154*b*'.

With the angle θ, the second focal points $F_2$ of the reflector 150 can be shifted from the position marked as the second focal points $F_2$' to a position marked as the second focal points $F_2$". Furthermore, the position of the condenser lens 110 is shifted along the arrow 104 to correspond to the position marked as the second focal points $F_2$", such that the focal plane 112 can be shifted form a position marked as the focal plane 112 to a position marked as the focal plane 112'. Therefore, the second focal points $F_2$" of the reflector 150, the focal plane 112', and the optical axis 114 are intersected at the same position (or the same point). In other words, in the present embodiment, by disposing the connecting element 160, the reflector 150 is arranged to have the angle θ relatively to the second plane 124. Therefore, the first light source 130 can be located closer to the optical axis 114, and the second focal points $F_2$ of the reflector 150 can be kept to intersect the focal plane 112 and the optical axis 114 at the same position (or the same point).

However, a person having ordinary skill in the art may choose a proper arrangement of the reflector 150, the connecting element 160, and the angle θ to adjust the relative position between the second focal points $F_2$ and the focal plane 112. For example, the size of the reflector 150 can be adjusted to make the second focal points $F_2$ move toward the first light source 130 after the connecting element 160 and the angle θ are arranged. In addition, the focal plane 112 also can be moved toward the first light source 130 by moving the condenser lens 110.

As described above, in the vehicle lamp of the present disclosure, the dark fringes caused by the gaps between the LED chips can be removed by the sectional-type reflector, such that the high beam projected by the vehicle lamp can meet the regulations of vehicle lighting. Moreover, by disposing the connecting element and tilting the reflector, the first light source can be located closer to the optical axis under the situation that the second focal points of the reflector, the focal plane, and the optical axis are intersected at the same position, such that the obvious cutoff line in the light pattern of the low beam is produced. Furthermore, in the vehicle lamp of the present disclosure, the high-beam light source is produced by the arrangement of the single reflector corresponding to the single light source.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of present disclosure provided they fall within the scope of the following claims.

What is claimed is:

1. A vehicle lamp, comprising:

a condenser lens having a focal plane and an optical axis;

a heat-dissipation base disposed at a side of the condenser lens, wherein the focal plane is disposed between the condenser lens and the heat-dissipation base;

a first light source disposed on the heat-dissipation base, wherein the first light source comprises a first light-emitting surface facing toward the focal plane;

a second light source disposed on the heat-dissipation base, wherein the second light source comprises a substrate and a plurality of second light-emitting surfaces, and the second light-emitting surfaces are disposed adjacent to each other on the substrate in a side-by-side arrangement, wherein the second light-emitting surfaces are defined as M light-emitting groups, and each of the light-emitting groups has N light-emitting zones, wherein M and N are greater than 1; and a reflector disposed on the heat-dissipation base, wherein the second light source faces toward the reflector, and the reflector comprises M reflective surfaces corresponding to the M light-emitting groups, and each of the reflective surfaces is a partial curved surface of an ellipsoid, and the reflective surfaces respectively have first focal points and second focal points, and the second focal points are located at the same position of the focal plane.

2. The vehicle lamp of claim 1, wherein one of edges of the first light source coincides with the optical axis.

3. The vehicle lamp of claim 1, wherein the heat-dissipation base comprises a first plane and a second plane which are connected to each other, and the second plane is tilted to the first plane, wherein the first light source is disposed on the first plane, and the second light source is disposed on the second plane.

4. The vehicle lamp of claim 1, wherein the M first focal points are respectively located within the M corresponding light-emitting groups.

5. The vehicle lamp of claim 1, wherein the first light-emitting surface and the second light-emitting surfaces comprise a light-emitting diode (LED) or an organic LED (OLED).

6. The vehicle lamp of claim 1, wherein the reflector has a symmetry axis, and the reflective surfaces are symmetric about the symmetry axis, and the light-emitting groups disposed on the substrate are symmetric about the symmetry axis.

7. The vehicle lamp of claim 1, further comprising a connecting element connecting the heat-dissipation base and the reflector, wherein the connecting element is configured to shift the second focal points of the reflective surfaces.

8. The vehicle lamp of claim 1, wherein the ellipsoid corresponding to each of the reflective surfaces has a major axis, and the major axis is a straight line connecting the first focal point and the second focal point in each of the ellipsoids, and the major axes of the ellipsoids intersect to each other at a point of the focal plane.

9. The vehicle lamp of claim 8, wherein an extending direction of each of the major axes of the ellipsoids is tilted to a plane on which the second light source is disposed with an angle, and the angle is in a range from 0 degree to 45 degrees.

* * * * *